July 1, 1969    L. MAIOCCHI    3,452,797
COUPLING PROFILES IN REMOVABLE TREAD TIRES
Filed Jan. 6, 1967

INVENTOR
Luigi Maiocchi

BY
ATTORNEYS

United States Patent Office 3,452,797
Patented July 1, 1969

3,452,797
COUPLING PROFILES IN REMOVABLE
TREAD TIRES
Luigi Maiocchi, Milan, Italy, assignor to Pirelli Società
per Azioni, Milan, Italy
Filed Jan. 6, 1967, Ser. No. 607,779
Claims priority, application Italy, Jan. 25, 1966,
13,763/66
Int. Cl. B60c 9/24, 11/02
U.S. Cl. 152—187                                  9 Claims

ABSTRACT OF THE DISCLOSURE

A pneumatic tire having a carrying casing and a removably tread ring extending over the casing and frictionally engaging same upon inflation of the tire, the engaging surface of the casing and the tread ring being provided with a plurality of longitudinally extending complementary grooves and ridges which engage to permit the tread ring to be centered with respect to the casing. Each ridge has a width slightly less than the width of its corresponding groove and a thickness slightly greater than the depth of its corresponding groove, the exact ratios between these dimensions being such that the tread ring is easily assembled on the casing when the tire is deflated, and such that the ridges are forced against the walls of the grooves when the tire is inflated to fix the ring on the casing.

BACKGROUND OF THE INVENTION

Field of the invention

The present invention relates to pneumatic tires of the so-called "removable tread" type, and more particularly, to pneumatic tires consisting of a tread ring and a carrying casing on which the tread ring is assembled.

Description of the prior art

Pneumatic tires of this kind, in which the tread ring is fastened to the carrying casing by virtue of the friction forces which are generated between the two units when the tire is in an inflated condition, are already known. To obtain this effect, the tread ring is provided with an internal reinforcement which makes it inextensible in a circumferential direction. Also, the ring has an inner diameter smaller than that of the outer diameter of the carrying casing if the latter were inflated devoid of the tread ring.

In tires of this kind, the friction forces due to the inflation pressure are generally sufficient to insure the perfect fastening of the two units constituting the tire, and consequently the coupling surfaces between the carrying casing and the tread ring could be perfectly smooth and cylindrical.

However, it has been experimentally ascertained that considerable advantages are obtained if the coupling surfaces are provided with longitudinal grooves and ridges complementary to one another in the two units of the tire, since this arrangement permits a perfect centering of the tread ring on the carrying casing. Moreover, during travel of the vehicle, these grooves and ridges prevent repeated transversal stresses in the same direction and sense, which may cause a displacement of the tread ring.

In fact, it also has been experimentally ascertained that, during cornering, if the tire is running in abnormal conditions (too low a pressure and high a speed with respect to the radius of the curve, etc.), the carrying casing may deform in such a way as to detach from the tread ring in the marginal portion of the latter. This phenomenon can obviously become dangerous, since it gives rise to a reduction of the coupling surface between the tread ring and the carrying casing. This detachment is never sufficient to allow the tread ring to come completely free from the carcass, but it can be sufficient to cause a small displacement of one unit with respect to the other, the cumulative effect of these displacements in the case of several sharp curves in the same direction causing a very large, and therefore dangerous, displacement.

Attempts have been made to eliminate this drawback by providing longitudinal ridges which remain engaged in their corresponding grooves even when a slight detachment takes place between the carcass and the tread.

In order to obtain a perfect performance in this type of arrangement, the longitudinal ridges should be larger than their corresponding grooves, so as to exert a rather large force on the lateral walls of the latter. However, if the ridges were made larger than the grooves, the assembling of the tread ring on the carrying casing would involve some difficulties, since the ridges could not be encased in the grooves to carry out their function of centering elements.

SUMMARY OF THE INVENTION

It is therefore an object of the present invention to provide a pneumatic tire having longitudinal ridges and grooves, which is easily assembled, and in which the ridges are forced in their corresponding grooves during use.

In general, the removable tread tire of the present invention consists of two units, namely a tread ring provided with a reinforcement inextensible in the longitudinal direction, and a carrying casing, the coupling profile between the two units comprising one or more longitudinal grooves provided in one of the units which encases corresponding longitudinal ridges protruding from the other unit. The tire is further characterized in that when the two units are separated from each other, each of said ridges has a width equal to or slightly less than the width of the corresponding groove, and a thickness greater than the depth of the corresponding groove, and the ratios between said widths, thickness and depth being such that, when the assembled tire is in an inflated condition, the inflation pressure exerts a strong compression on the ridges causing them to widen and to be forced in a transverse direction against the walls of the groove. This pushes the carrying casing against the tread ring since the latter is made inextensible by an internal reinforcement. It has been discovered that the exact ratio between the width of the ridge and that of the groove should range between 0.80:1 and 1.0:1. In any case the difference in these widths should not be greater than 20%.

According to a preferred embodiment of the invention, the ridges are disposed on the inner surface of the tread ring, while the corresponding grooves are obtained on the outer surface of the carrying casing. The ridges have a width considerably greater than their thickness and, preferably, the ratio between their width and thickness should range between 2:1 and 6:1.

As emphasized above, the thickness of a ridge must always be greater than the depth of the corresponding groove, and preferably this ratio should range between 1.05:1 and 1.4:1.

As the depth of the groove is always less than the thickness of the ridge, a portion of the ridge protrudes from the groove. It is therefore understood that the above cited width ratios refer to any point of the ridge with respect to the corresponding point of the corresponding groove, and only to the portion of ridge which is encased in the groove.

BRIEF DESCRIPTION OF THE DRAWINGS

The invention will now be better described with reference to the attached drawings, given by way of example, in which.

DESCRIPTION OF THE PREFERRED EMBODIMENTS

Figure 1:
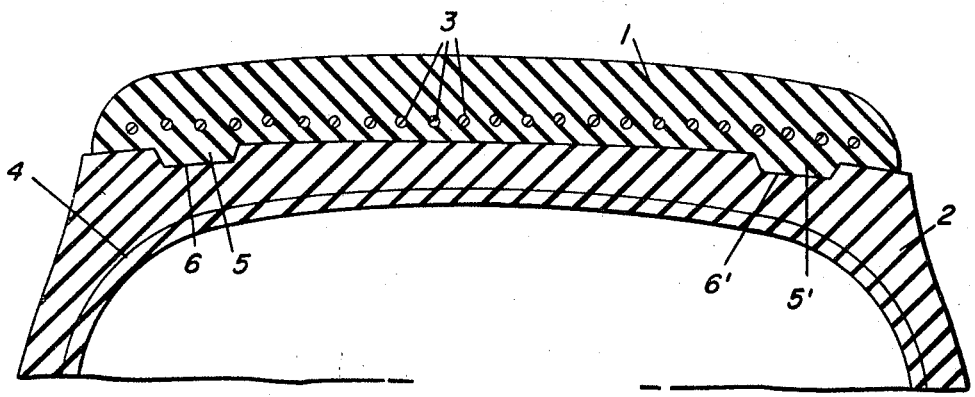
FIG. 1 represents, in section, a removable tread tire, the coupling profile of which shows ridges and grooves.

FIG. 1 represents a removable tread tire consisting of two units, namely a tread ring 1 and a carrying casing 2. The tire represented is of the type in which the fastening of the two units is due to the inflation pressure of the tire, and therefore the tread ring 1 is provided with a reinforcing structure 3, which is inextensible in the longitudinal direction. The carrying casing 2 is provided with a carcass 4 which is diagrammatically indicated with a continuous line, and which consists of a plurality of plies having radial cords.

The coupling profile between the tread ring and the carrying casing shows two longitudinal ridges 5 and 5' projecting from the tread ring, which are respectively encased in the grooves 6 and 6', provided on the carrying casing, these ridges and grooves all having a trapezoidal cross section.

Figure 2:
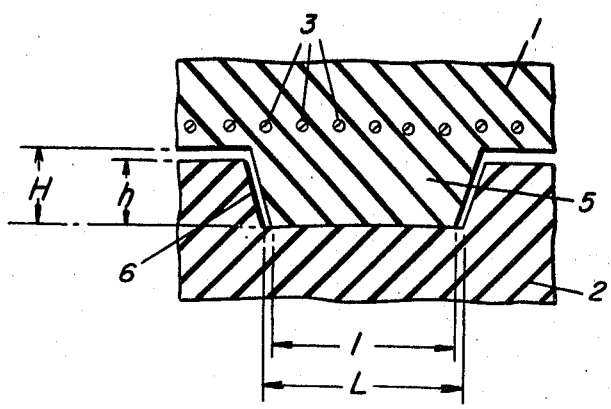
FIG. 2 represents, in enlarged section, a ridge encased in the corresponding groove, the tire being in a deflated condition.

FIG. 2 represents an enlarged detail of a cooperating ridge and groove when the tire is in a deflated condition. The ridge 5 has a thickness H which is greater than the depth $h$ of the groove 6, the ratio $H:h$ being equal to 1.2:1. The ratio $l:L$ between the width of the ridge and that of the groove, both measured at the bottom of the latter, is equal to 0.94:1. As may be seen from FIG. 2, the ridge 5 may easily penetrate in the groove 6 on account of the greater width of the latter, but cannot be completely encased into it due to its greater thickness.

Figure 3:
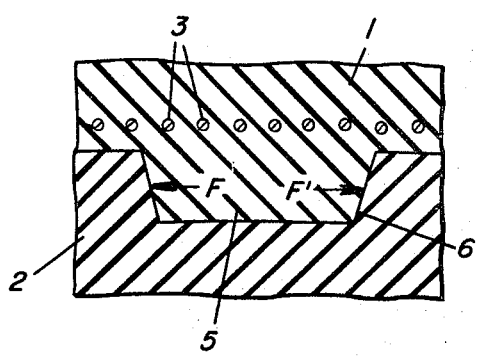
FIG. 3 represents the ridge and the groove of FIG. 2, the tire being in an inflated condition.

When the tire is inflated as shown in FIG. 3, the carrying casing 2 is pushed with a large amount of force against the inextensible reinforcement 3, thus compressing the ridge 5. The latter, due to the pressure exerted by the inextensible reinforcement 3, is compelled to widen, thus exerting two forces F and F' against the walls of the groove 6, causing the ridge to be locked into the groove.

By way of example, in an 11.00–20 tire, the thickness H and the depth $h$ can have a value of 5.5 mm. and 4.5 mm., respectively, while the widths L and $l$ can have a value of 16 mm. and 15 mm., respectively.

It thus is apparent from the above that the ridges of the tire of the present invention are forced into the grooves only when the tire is in service, and not during the assembling phase, so that the positioning of the tread ring on the carrying casing is facilitated during assembly.

I claim:

1. A removable tread tire having a carrying casing and a removable tread ring provided with a reinforcement inextensible in the longitudinal direction, said ring extending over said casing and frictionally engaging same upon inflation of the tire, wherein the improvement comprises a longitudinally extending complementary ridge and groove means provided on the engaging surfaces of said casing and said ring, the ridge of said ridge and groove means normally having a width less than the width of its corresponding groove and a thickness greater than the depth of the groove, the ratio between said widths and between said thickness and depth being such that the ridge is forced against the walls of its corresponding groove upon inflation of the tire to fix said ring on said casing.

2. A pneumatic tire as in claim 1, wherein the ratio between the width and the thickness of a ridge is between 2:1 and 6:1.

3. A pneumatic tire as in claim 1, wherein the ratio between the thickness of a ridge and the depth of a corresponding groove is between 1.05:1 and 1.4:1.

4. A pneumatic tire as in claim 3, wherein said ridge has a thickness of approximately 5.5 mm. and wherein said groove has a depth of approximately 4.5 mm.

5. A pneumatic tire as in claim 1, wherein the ratio between the width of a ridge and the width of a corresponding groove is between 0.8:1 and 1:1.

6. A pneumatic tire as in claim 5, wherein said ridge has a width of approximately 15 mm. and wherein said groove has a width of approximately 16 mm.

7. A pneumatic tire as in claim 1, wherein a ridge has a thickness of approximately 5.5 mm. and a width of approximately 15 mm., while its corresponding groove has a depth of approximately 4.5 mm. and a width of approximately 16 mm.

8. A pneumatic tire as in claim 1, wherein said ridge and groove have trapezoidal cross sections.

9. A pneumatic tire as in claim 1, wherein said ridge is provided on the inner surface of said ring while the corresponding groove is provided on the outer surface of said casing.

References Cited

UNITED STATES PATENTS

| | | | |
|---|---|---|---|
| 2,254,329 | 9/1941 | Stephens | 152—188 |
| 2,609,026 | 9/1952 | Luchsinger-Caballero | 152—176 |
| 3,224,482 | 12/1965 | Barassi | 152—176 |

FOREIGN PATENTS 1,305,928  9/1962  France.

ARTHUR L. LA POINT, *Primary Examiner.*

CHARLES B. LYON, *Assistant Examiner.*

U.S. Cl. X.R.

152—361